United States Patent
Nishio et al.

(10) Patent No.: US 12,451,513 B2
(45) Date of Patent: Oct. 21, 2025

(54) SOLID ELECTROLYTE COMPOSITION AND METHOD OF PRODUCING SOLID ELECTROLYTE MEMBER

(71) Applicant: Panasonic Intellectual Property Management Co., Ltd., Osaka (JP)

(72) Inventors: Yusuke Nishio, Osaka (JP); Akihiro Sakai, Nara (JP); Akinobu Miyazaki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 673 days.

(21) Appl. No.: 17/333,047

(22) Filed: May 28, 2021

(65) Prior Publication Data

US 2021/0328262 A1 Oct. 21, 2021

Related U.S. Application Data

(63) Continuation of application No. PCT/JP2019/043916, filed on Nov. 8, 2019.

(30) Foreign Application Priority Data

Dec. 26, 2018 (JP) .................. 2018-243666
Apr. 17, 2019 (JP) .................. 2019-078506

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC .................. H01M 10/0562; H01M 10/0525
See application file for complete search history.

(56) References Cited

U.S. PATENT DOCUMENTS

2013/0334063 A1* 12/2013 Rosenblatt ........... G01N 33/182
                                                                204/422
2016/0268661 A1* 9/2016 Kim .................. H01M 10/0568
2017/0301950 A1 10/2017 Mimura et al.
(Continued)

FOREIGN PATENT DOCUMENTS

CN          108701860 A        10/2018
JP          2001-006745        1/2001
(Continued)

OTHER PUBLICATIONS

Bohnsack et al. (Z. anorg. allg. Chem. 623 (1997) 1067-1073).*
(Continued)

*Primary Examiner* — Olatunji A Godo
(74) *Attorney, Agent, or Firm* — Rimon P.C.

(57) ABSTRACT

The present disclosure provides a solid electrolyte composition that can suppress deterioration in ion conductivity of an ionic solid electrolyte material. The solid electrolyte composition according to the present disclosure contains a sulfur element-free ionic solid electrolyte material and an organic solvent, where the organic solvent includes at least one selected from the group consisting of a hydrocarbon and a compound having a functional group; and the functional group is at least one selected from the group consisting of an ether group, a halogen group, and a Si—O—C group.

3 Claims, 4 Drawing Sheets

(56) References Cited

U.S. PATENT DOCUMENTS

| | | | |
|---|---|---|---|
| 2019/0080814 A1* | 3/2019 | Shimada | H01M 10/0525 |
| 2019/0088995 A1 | 3/2019 | Asano et al. | |
| 2019/0097266 A1* | 3/2019 | Yamamoto | H01M 10/0585 |
| 2019/0386322 A1 | 12/2019 | Yawata et al. | |
| 2020/0020895 A1* | 1/2020 | Collins | H01M 10/0525 |

FOREIGN PATENT DOCUMENTS

| | | |
|---|---|---|
| JP | 2016-212991 | 12/2016 |
| WO | 2016/129427 | 8/2016 |
| WO | 2016/194705 A1 | 12/2016 |
| WO | 2017/126416 A1 | 7/2017 |
| WO | 2018/025582 | 2/2018 |
| WO | 2018/168505 | 9/2018 |

OTHER PUBLICATIONS

Wickleder et al. (Z. anorg. allg. Chem. 621 (1995) 457-463).*
International Search Report of PCT application No. PCT/JP2019/043916 dated Dec. 10, 2019.
English Translation of Chinese Search Report dated Feb. 1, 2024 for the related Chinese Patent Application No. 201980059671.6.
English Translation of Chinese Search Report dated Oct. 13, 2023 for the related Chinese Patent Application No. 201980059671.6.

* cited by examiner

SOLID ELECTROLYTE COMPOSITION AND METHOD OF PRODUCING SOLID ELECTROLYTE MEMBER

BACKGROUND

1. Technical Field

The present disclosure relates to a solid electrolyte composition used, for example, for manufacturing solid-state batteries and to a method of producing a solid electrolyte member.

2. Description of the Related Art

International Publication No. 2018/025582 discloses halide solid electrolytes. Meanwhile, International Publication No. 2018/168505 discloses sulfide solid electrolytes.

SUMMARY

In the conventional techniques, it has been desired that a solid electrolyte composition should suppress deterioration in ionic conductivity of a solid electrolyte material.

In one general aspect, the techniques disclosed here feature a solid electrolyte composition containing a sulfur element-free ionic solid electrolyte material and an organic solvent, where the organic solvent includes at least one selected from the group consisting of a hydrocarbon and a compound having a functional group; and the functional group is at least one selected from the group consisting of an ether group, a halogen group, and a Si—O—C group.

By using the solid electrolyte composition according to the present disclosure, it is possible to suppress deterioration in ionic conductivity of a sulfur element-free ionic solid electrolyte material.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
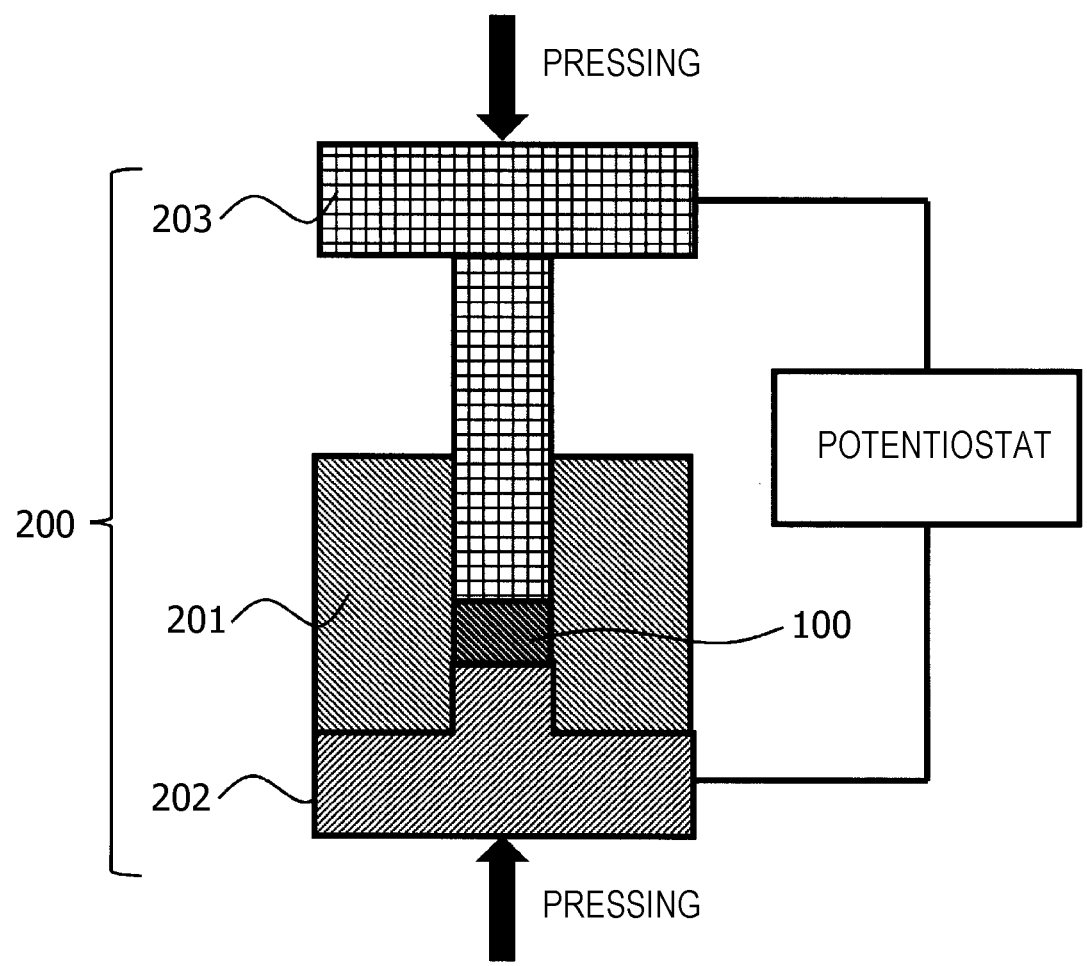
FIG. 1 is a schematic view illustrating an evaluation method for the lithium ion conductivity of a solid electrolyte material.

Hereinafter, embodiments of the present disclosure will be described with reference to the drawings.

Viewpoint of Inventors

In the field of rechargeable batteries for which a higher energy density and a higher capacity are needed, organic electrolyte solutions, in which an electrolyte salt is dissolved in an organic solvent, have been used conventionally and predominantly. In rechargeable batteries using organic electrolyte solutions, liquid leakage is a concern. In addition, a possible increase in the amount of heat generated in case of a short circuit or the like is also pointed out.

Meanwhile, solid-state rechargeable batteries using an inorganic solid electrolyte in place of an organic electrolyte solution are increasingly drawing attention. Solid-state rechargeable batteries are free from liquid leakage. In addition, since inorganic solid electrolytes are nonflammable, heat generation in case of a short circuit or the like is expected to be suppressed.

Inorganic solid electrolytes used for solid-state rechargeable batteries are known to be divided broadly into sulfide-based solid electrolytes, which contain sulfur as a main component, and oxide-based solid electrolytes, which contain a metal oxide as a main component. However, sulfide-based solid electrolytes have a disadvantage of generating toxic hydrogen sulfide when reacting with moisture, whereas oxide-based solid electrolytes have a disadvantage of low ionic conductivity. For this reason, the development of a novel solid electrolyte material that exhibits high ionic conductivity is hoped for.

As a novel solid electrolyte material, for example, a sulfur element-free ionic solid electrolyte material consisting of lithium element, yttrium element, and at least one halogen element is anticipated. For the practical use of a solid-state rechargeable battery using an ionic solid electrolyte material, a technique is needed for preparing a fluid composition containing an ionic solid electrolyte material and applying the composition to the surface of an electrode or a current collector, thereby forming a solid electrolyte member.

To prepare a fluid composition, it is needed to mix an ionic solid electrolyte material with an organic solvent. For this reason, the inventors investigated, using lithium ion conductivity as an indicator, the tolerance of an ionic solid electrolyte material to various organic solvents. Consequently, it was found that the lithium ion conductivity of an ionic solid electrolyte material decreases in some cases when mixed with an organic solvent. For example, even an organic solvent that is usable for sulfide-based solid electrolytes is not usable for ionic solid electrolyte materials in some cases. From this viewpoint, the constitution of the present disclosure was obtained.

Embodiment 1

The solid electrolyte composition in Embodiment 1 contains a sulfur element-free ionic solid electrolyte material and an organic solvent.

The ionic solid electrolyte material may be any solid electrolyte material that is ionically bonded and exhibits ionic conductivity. In general, the bonding between atoms having a large difference in electronegativity is called ionic bonding. For example, metal elements tend to have a low electronegativity whereas nonmetal elements tend to have a high electronegativity. Herein, an ionic solid electrolyte material may be a solid electrolyte material having a bond, for example, between a nonmetal element and a metal element excluding lithium element.

The organic solvent includes at least one selected from the group consisting of a hydrocarbon and a compound having a functional group. The functional group is at least one selected from the group consisting of an ether group, a halogen group, and a Si—O—C group.

The hydrocarbon is a compound consisting solely of carbon and hydrogen and may be any of an aliphatic hydrocarbon, an alicyclic hydrocarbon, and an aromatic hydrocarbon. From a viewpoint of enhancing the dispersibility of a solid electrolyte material in the solid electrolyte composition, an aromatic hydrocarbon is desirable. The hydrocarbon may be a saturated hydrocarbon or may be an unsaturated hydrocarbon. Meanwhile, the compound having a functional group may consist solely of carbon and hydrogen in the portion excluding the functional group. In other words, the compound having a functional group may have a structure in which at least one hydrogen atom of a hydrocarbon is replaced with at least one selected from the group consisting of an ether group, a halogen group, and a Si—O—C group.

More specifically, the organic solvent may include at least one selected from the group consisting of a hydrocarbon, a halogenated hydrocarbon, an ether, and a silyl ether. The silyl ether may be an alkoxysilane. The number of ether groups in an organic solvent molecule is not particularly limited but may be one, for example. The boiling point of the organic solvent is not particularly limited but may be 200° C. or higher, for example. The organic solvent may be any liquid that can disperse an ionic solid electrolyte material and need not dissolve an ionic solid electrolyte material.

According to the above constitution, a solid electrolyte composition with reduced deterioration in ionic conductivity can be provided. In other words, it is possible to obtain a solid electrolyte member (solid electrolyte membrane, for example) that exhibits excellent ionic conductivity when an organic solvent is removed, through drying, from a solid electrolyte composition containing the organic solvent and a sulfur element-free ionic solid electrolyte material (non-sulfide-based solid electrolyte material).

The ionic solid electrolyte material may exhibit lithium ion conductivity, for example.

The ionic solid electrolyte material may contain, for example, at least one element selected from the group consisting of Mg, Ca, Sr, Ba, Zn, Sn, Al, Sc, Ga, Bi, Sb, Zr, Hf, Ti, Ta, Nb, W, Y, Gd, Tb, and Sm. These elements can form a cation in water.

The ionic solid electrolyte material may further contain, for example, at least one halogen element selected from the group consisting of Cl, Br, I, and F.

These elements can form an anion in water.

In a solid electrolyte composition having the above constitution, deterioration in lithium ion conductivity is readily suppressed further. Consequently, it is possible to produce a solid electrolyte member that exhibits higher lithium ion conductivity.

The ionic solid electrolyte material may contain Li; at least one selected from the group consisting of Gd, Ca, Zr, and Y; and at least one selected from the group consisting of Cl, Br, I, and F.

In a solid electrolyte composition having the above constitution, deterioration in lithium ion conductivity is readily suppressed further.

Consequently, it is possible to produce a solid electrolyte member that exhibits higher lithium ion conductivity.

Moreover, the ionic solid electrolyte material may be a material containing Li, Y, and at least one selected from the group consisting of Cl, Br, I, and F.

More specifically, the ionic solid electrolyte material may be a material containing Li, Y, Cl, and Br; a material containing Li, Ca, Y, Gd, Cl, and Br; or a material containing Li, Zr, Y, and Cl.

Further specifically, the ionic solid electrolyte material may be $Li_3YBr_2Cl_4$, $Li_{2.8}Ca_{0.1}Y_{0.5}Gd_{0.5}Br_2Cl_4$, or $Li_{2.5}Y_{0.5}Zr_{0.5}Cl_6$.

Furthermore, the ionic solid electrolyte material may be a material consisting essentially of: Li; at least one element selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; and at least one element selected from the group consisting of Cl, Br, I, and F.

Herein, the expression "consisting essentially of: Li; at least one element selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; and at least one element selected from the group consisting of Cl, Br, I, and F" means "comprising only Li and elements selected from each group except for incidental impurities and the like that are unintentionally incorporated into." Accordingly, for example, the expression "consisting essentially of Li, Y, Cl, and Br" means "comprising only Li, Y, Cl, and Br except for incidental impurities and the like that are unintentionally incorporated into." Hereinafter, similar expressions have the similar meaning. Exemplary incidental impurities include oxygen element.

The ionic solid electrolyte material may be a material consisting essentially of Li, Y, Cl, and Br. Moreover, the ionic solid electrolyte material may be a material consisting essentially of Li, Ca, Y, Gd, Cl, and Br. Further, the ionic solid electrolyte material may be a material consisting essentially of Li, Zr, Y, and Cl.

When the organic solvent is a compound having a functional group, the compound having a functional group need not essentially contain a functional group other than an ether group and a halogen group. The dispersibility of an ionic solid electrolyte material in such an organic solvent is satisfactory. Particularly, the dispersibility of the ionic solid electrolyte material that is a halide (hereinafter, also referred to as halide solid electrolyte material) in such an organic solvent is satisfactory. By using a solid electrolyte composition having excellent dispersibility, it is possible to form a further closely packed solid electrolyte member that exhibits excellent lithium ion conductivity. For example, a closely packed solid electrolyte membrane having reduced pinholes, unevenness, and the like can be formed easily.

The organic solvent may have a cyclic structure. The dispersibility of an ionic solid electrolyte material in an organic solvent having a cyclic structure is satisfactory, and particularly, the dispersibility of a halide solid electrolyte material is satisfactory. The cyclic structure may be an aromatic cyclic structure. In other words, the organic solvent may be an aromatic compound. The dispersibility of an ionic solid electrolyte material in an aromatic compound is satisfactory, and particularly, the dispersibility of a halide solid electrolyte material is satisfactory.

More specifically, the organic solvent may include at least one selected from the group consisting of tetralin, ethylbenzene, mesitylene, pseudocumene, xylene, cumene, dibutyl ether, anisole, 1,2,4-trichlorobenzene, chlorobenzene, 2,4-dichlorotoluene, o-chlorotoluene, 1,3-dichlorobenzene, p-chlorotoluene, 1,2-dichlorobenzene, 1,4-dichlorobutane, 3,4-dichlorotoluene, and tetraethyl orthosilicate. The dispersibility of an ionic solid electrolyte material in these organic solvents is extremely satisfactory, and particularly, the dispersibility of a halide solid electrolyte material is satisfactory.

As a halide solid electrolyte material, a material represented by compositional formula (1) of $$Li_\alpha M_\beta X_\gamma,$$

for example, may be used. Here, α, β, and γ are each independently a value greater than 0; M is at least one selected from the group consisting of metalloid elements and metal elements excluding Li; and X is at least one selected from the group consisting of Cl, Br, and I.

The term "metalloid element" used herein means at least one selected from the group consisting of B, Si, Ge, As, Sb, and Te.

The term "metal elements" used herein include (i) all the elements in Group 1 to Group 12 of the periodic table (excluding hydrogen) and (ii) all the elements in Group 13 to Group 16 of the periodic table (excluding B, Si, Ge, As, Sb, Te, C, N, P, O, S, and Se). A metal element forms, as a cation, an inorganic compound together with a halide ion.

In compositional formula (1), M may include Y (yttrium). In other words, a halide solid electrolyte material may contain Y as metal element M. Since a halide solid electrolyte material is excellent in ionic conductivity, a solid-state battery using a halide solid electrolyte material can exhibit excellent charge-discharge efficiency.

Specific examples of a halide solid electrolyte material containing Y include a compound represented by a compositional formula of $Li_aMe_bY_cX_6$ where $a+mb+3c=6$, $c>0$, Me is at least one selected from the group consisting of metalloid elements and metal elements excluding Li and Y, m is the valence of Me.

Me is, for example, at least one selected from the group consisting of Mg, Ca, Sr, Ba, Zn, Sc, Al, Ga, Bi, Zr, Hf, Ti, Sn, Ta, and Nb. In this case, it is possible to further enhance the ionic conductivity of the halide solid electrolyte material.

A halide solid electrolyte material may be a material represented by compositional formula (A1) of $$Li_{6-3d}Y_dX_6.$$

Here, X is one or more elements selected from the group consisting of Cl, Br, and I. Compositional formula (A1) may satisfy $0<d<2$.

Compositional formula (A1) may satisfy $d=1$. In other words, the halide solid electrolyte material may be a material represented by compositional formula (A2) of $$Li_3YX_6.$$

A halide solid electrolyte material may be a material represented by compositional formula (A3) of $$Li_{3-3\delta}Y_{1+\delta}Cl_6.$$

Compositional formula (A3) may satisfy $0<\delta\leq0.15$.

A halide solid electrolyte material may be a material represented by compositional formula (A4) of $$Li_{3-3\delta}Y_{1+\delta}Br_6.$$

Compositional formula (A4) may satisfy $0<\delta\leq0.25$.

A halide solid electrolyte material may be a material represented by compositional formula (A5) of $$Li_{3-3\delta+a}Y_{1+\delta-a}Me_aCl_{6-x-y}Br_xI_y.$$

Here, Me may be at least one selected from the group consisting of Mg, Ca, Sr, Ba, and Zn. In compositional formula (A5), for example, $-1<\delta<2$, $0<a<3$, $0<(3-3\delta+a)$, $0<(1+\delta-a)$, $0\leq x\leq 6$, $0\leq y\leq 6$, and $(x+y)\leq 6$ are satisfied.

A halide solid electrolyte material may be a material represented by compositional formula (A6) of $$Li_{3-3\delta-a}Y_{1+\delta-a}Me_aCl_{6-x-y}Br_xI_y.$$

Here, Me may be at least one selected from the group consisting of Al, Sc, Ga, and Bi. In compositional formula (A6), for example, $-1<\delta<1$, $0<a<2$, $0<(1+\delta-a)$, $0\leq x\leq 6$, $0\leq y\leq 6$, and $(x+y)$ 6 are satisfied.

A halide solid electrolyte material may be a material represented by compositional formula (A7) of $$Li_{3-3\delta-a}Y_{1+\delta-a}Me_aCl_{6-x-y}Br_xI_y.$$

Here, Me may be at least one selected from the group consisting of Zr, Hf, and Ti. In compositional formula (A7), for example, $-1<\delta<1$, $0<a<1.5$, $0<(3-3\delta-a)$, $0<(1+\delta-a)$, $0\leq x\leq 6$, $0\leq y\leq 6$, and $(x+y)\leq 6$ are satisfied.

A halide solid electrolyte material may be a material represented by compositional formula (A8) of $$Li_{3-3\delta-2a}Y_{1+\delta-a}Me_aCl_{6-x-y}Br_xI_y.$$

Here, Me may be at least one selected from the group consisting of Ta and Nb. In compositional formula (A8), for example, $-1<\delta<1$, $0<a<1.2$, $0<(3-3\delta-2a)$, $0<(1+\delta-a)$, $0\leq x\leq 6$, $0\leq y\leq 6$, and $(x+y)$ 6 are satisfied.

Halide solid electrolyte materials of compositional formulae (A1) to (A8) have high ionic conductivity. Consequently, solid-state batteries using the halide solid electrolyte materials of compositional formulae (A1) to (A8) can exhibit excellent charge-discharge efficiency.

Embodiment 2

Figure 4:
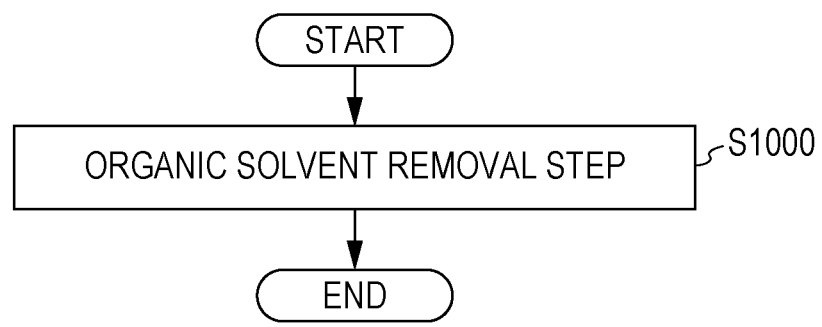
FIG. 4 is a flow chart of an exemplary method of producing a solid electrolyte member in Embodiment 2.

Hereinafter, Embodiment 2 will be described. The explanations same as Embodiment 1 described above will be omitted appropriately. FIG. 4 is a flow chart of an exemplary method of producing a solid electrolyte member in Embodiment 2.

The method of producing a solid electrolyte member in Embodiment 2 includes removal step S1000 of removing an organic solvent from the solid electrolyte composition in Embodiment 1 described above. Herein, the solid electrolyte member is a member containing an ionic solid electrolyte material. The solid electrolyte member may be, for example, a solid electrolyte layer or a solid electrolyte membrane containing an ionic solid electrolyte material or an electrode layer containing an ionic solid electrolyte material.

By removing an organic solvent from a solid electrolyte composition containing a sulfur element-free ionic solid electrolyte material and the organic solvent, it is possible to produce a solid electrolyte member that exhibits high lithium ion conductivity, such as a homogenous solid electrolyte membrane.

In removal step S1000, an organic solvent is removed from a solid electrolyte composition. In this step, the organic solvent may be removed through drying under reduced pressure. The solid electrolyte composition before removal of the organic solvent is fluid and thus excellent in formability. Consequently, it is possible to form, for example, a coating film having excellent uniformity in thickness. Through drying of such a coating film, a closely packed solid electrolyte membrane having reduced pinholes, unevenness, and the like can be obtained easily.

Drying under reduced pressure indicates removal of an organic solvent from a solid electrolyte composition in an atmosphere of a pressure lower than atmospheric pressure. The atmosphere of a pressure lower than atmospheric pressure may be, for example, −0.01 MPa or lower as a gauge pressure, and vacuum drying may be performed. Vacuum drying indicates, for example, removal of an organic solvent from a solid electrolyte composition at the vapor pressure or lower at a temperature 20° C. lower than the boiling point of the organic solvent. During drying under reduced pressure, a solid electrolyte composition or a solid electrolyte member may be heated to 50° C. or higher and 250° C. or lower, for example.

Hereinafter, the details of the present disclosure will be described on the basis of the working examples with reference to Tables 1, 2, and 3. Table 1 shows the measured results of lithium ion conductivities for solid electrolyte members formed from solid electrolyte compositions containing an organic solvent and an ionic solid electrolyte material represented by a compositional formula of $Li_3YBr_2Cl_4$ (hereinafter, denoted by LYBC) or a sulfide solid electrolyte material represented by a compositional formula of $Li_2S$—$P_2S_5$ (hereinafter, denoted by LPS). Table 2 shows the measured results of lithium ion conductivities for solid electrolyte members formed from solid electrolyte compositions containing an organic solvent and an ionic solid electrolyte material represented by a compositional formula of $Li_{2.8}Ca_{0.1}Y_{0.5}Gd_{0.5}Br_2Cl_4$ (hereinafter, denoted by LCYGBC). Table 3 shows the measured result of lithium ion conductivity for a solid electrolyte member formed from a solid electrolyte composition containing an organic solvent and an ionic solid electrolyte material represented by a compositional formula of $Li_{2.5}Y_{0.5}Zr_{0.5}Cl_6$ (hereinafter, denoted by LYZC). Tables 1, 2, and 3 also show the compound names, polar terms $\delta_p$ of Hansen solubility parameter, skeletal structures, substituents, and boiling points of organic solvents contained in the respective solid electrolyte compositions as well as the lithium ion conductivities of LYBC, the lithium ion conductivities of LPS, and the lithium ion conductivities of LCYGBC and LYZC. In Table 1, A1 to A18 correspond to Examples 1 to 18, B1 to B14 correspond to Comparative Examples 1 to 14, and C1 corresponds to a reference example. In Table 2, A19 to A25 correspond to Examples 19 to 25, and C2 corresponds to a reference example. In Table 3, A26 corresponds to Example 26, and C3 corresponds to a reference example.

TABLE 1

| | Organic solvent | $\delta p$ | Skeletal structure | Substituent | Boiling point: °C. | Ionic conductivity: S/cm LYBC | LPS |
|---|---|---|---|---|---|---|---|
| A1 | Tetralin | 2.0 | aromatic | — | 208 | $1.7 \times 10^{-3}$ | $7.8 \times 10^{-4}$ |
| A2 | Ethylbenzene | 0.6 | aromatic | ethyl group | 136 | $1.9 \times 10^{-3}$ | $7.7 \times 10^{-4}$ |
| A3 | Mesitylene | 0.6 | aromatic | methyl group | 165 | $1.9 \times 10^{-3}$ | $7.9 \times 10^{-4}$ |
| A4 | Pseudocumene | 1.0 | aromatic | methyl group | 169 | $1.3 \times 10^{-3}$ | $7.9 \times 10^{-4}$ |
| A5 | Xylene | 1.0 | aromatic | methyl group | 140 | $1.9 \times 10^{-3}$ | $7.9 \times 10^{-4}$ |
| A6 | Cumene | 1.2 | aromatic | isopropyl group | 152 | $1.2 \times 10^{-3}$ | $7.4 \times 10^{-4}$ |
| A7 | Dibutyl ether | 3.4 | nonaromatic | ether group | 141 | $1.4 \times 10^{-3}$ | $8.0 \times 10^{-4}$ |
| A8 | Anisole | 4.4 | aromatic | ether group | 154 | $1.9 \times 10^{-3}$ | $8.0 \times 10^{-4}$ |
| A9 | 1,2,4-Trichlorobenzene | 4.2 | aromatic | chloro group | 213 | $1.7 \times 10^{-3}$ | — |
| A10 | Chlorobenzene | 4.3 | aromatic | chloro group | 132 | $1.8 \times 10^{-3}$ | $7.9 \times 10^{-4}$ |
| A11 | 2,4-Dichlorotoluene | 4.3 | aromatic | chloro group | 200 | $1.7 \times 10^{-3}$ | — |
| A12 | o-Chlorotoluene | 4.9 | aromatic | chloro group | 159 | $1.6 \times 10^{-3}$ | $7.9 \times 10^{-4}$ |
| A13 | 1,3-Dichlorobenzene | 5.1 | aromatic | chloro group | 173 | $1.7 \times 10^{-3}$ | — |
| A14 | p-Chlorotoluene | 6.2 | aromatic | chloro group | 163 | $1.6 \times 10^{-3}$ | $7.7 \times 10^{-4}$ |
| A15 | 1,2-Dichlorobenzene | 6.3 | aromatic | chloro group | 180 | $1.6 \times 10^{-3}$ | — |
| A16 | 1,4-Dichlorobutane | 7.7 | nonaromatic | chloro group | 155 | $1.6 \times 10^{-3}$ | $7.6 \times 10^{-4}$ |
| A17 | 3,4-Dichlorotoluene | 9.8 | aromatic | chloro group | 205 | $1.7 \times 10^{-3}$ | — |
| A18 | Tetraethyl orthosilicate | 4.3 | silicic acid compound | — | 166 | $1.0 \times 10^{-3}$ | $7.9 \times 10^{-4}$ |
| B1 | Butyl butyrate | 2.9 | nonaromatic | ester group | 165 | failed drying | $7.9 \times 10^{-4}$ |
| B2 | Ethyl 3-ethoxypropionate | 3.3 | nonaromatic | ester group | 170 | high resistance | $8.1 \times 10^{-4}$ |
| B3 | Butyl acetate | 3.7 | nonaromatic | ester group | 126 | $1.1 \times 10^{-9}$ | $8.2 \times 10^{-4}$ |
| B4 | 2-Ethylhexyl acrylate | 4.3 | nonaromatic | ester group | 216 | failed drying | $7.9 \times 10^{-4}$ |
| B5 | 2-Ethoxyethyl acetate | 4.7 | nonaromatic | ester group | 157 | failed drying | $8.2 \times 10^{-4}$ |
| B6 | Ethyl benzoate | 6.2 | aromatic | ester group | 213 | high resistance | $8.1 \times 10^{-4}$ |
| B7 | Diisobutyl ketone | 3.7 | nonaromatic | ketone group | 168 | high resistance | $7.2 \times 10^{-4}$ |
| B8 | Isophorone | 8.0 | cyclic | ketone group | 215 | failed drying | $7.6 \times 10^{-4}$ |
| B9 | N-Methylpyrrolidone | 12.3 | cyclic | ketone group | 202 | $1.8 \times 10^{-7}$ | high resistance |
| B10 | N,N-Dimethyldodecylamine | 1.6 | nonaromatic | amino group | 271 | failed drying | $7.6 \times 10^{-4}$ |
| B11 | N,N-Dimethylaniline | 3.2 | aromatic | amino group | 194 | $7.5 \times 10^{-4}$ | $7.7 \times 10^{-4}$ |
| B12 | N-Methylaniline | 6.0 | aromatic | amino group | 196 | $1.1 \times 10^{-7}$ | $7.9 \times 10^{-4}$ |
| B13 | 2-Ethyl-1-hexanol | 3.3 | nonaromatic | hydroxy group | 185 | $9.8 \times 10^{-6}$ | $7.9 \times 10^{-4}$ |
| B14 | Benzaldehyde | 7.4 | aromatic | aldehyde group | 179 | failed drying | $7.5 \times 10^{-4}$ |
| C1 | Without immersion in solvent (drying only) Skeletal structure | — | — | — | — | $1.9 \times 10^{-3}$ | $8.0 \times 10^{-4}$ |

TABLE 2

| | Organic solvent | δp | Skeletal structure | Substituent | Boiling point: °C. | Ionic conductivity: S/cm LCYGBC |
|---|---|---|---|---|---|---|
| A19 | Tetralin | 2.0 | aromatic | — | 208 | $8.8 \times 10^{-4}$ |
| A20 | Mesitylene | 0.6 | aromatic | methyl group | 165 | $9.4 \times 10^{-4}$ |
| A21 | Cumene | 1.2 | aromatic | isopropyl group | 152 | $1.0 \times 10^{-3}$ |
| A22 | Dibutyl ether | 3.4 | nonaromatic | ether group | 141 | $1.2 \times 10^{-3}$ |
| A23 | Anisole | 4.4 | aromatic | ether group | 154 | $9.2 \times 10^{-4}$ |
| A24 | p-Chlorotoluene | 6.2 | aromatic | chloro group | 163 | $1.1 \times 10^{-3}$ |
| A25 | 3,4-Dichlorotoluene | 9.8 | aromatic | chloro group | 205 | $1.0 \times 10^{-3}$ |
| C2 | Without immersion in solvent (drying only) | — | — | — | — | $1.0 \times 10^{-3}$ |

TABLE 3

| | Organic solvent | δp | Skeletal structure | Substituent | Boiling point: °C. | Ionic conductivity: S/cm LYZC |
|---|---|---|---|---|---|---|
| A26 | p-Chlorotoluene | 6.2 | aromatic | chloro group | 163 | $1.2 \times 10^{-3}$ |
| C3 | Without immersion in solvent (drying only) | — | — | — | — | $1.2 \times 10^{-3}$ |

Preparation of Solid Electrolyte Compositions

A solid electrolyte composition was prepared by weighing 300 mg of LYBC in a commercial screw cap vial, weighing 150 mg of an organic solvent, adding the organic solvent to the vial, and stirring/mixing with a spatula. As for LPS, a solid electrolyte composition was prepared by weighing 150 mg of LPS and stirring/mixing with 150 mg of an organic solvent through the same procedure. As for LCYGBC and LYZC, a solid electrolyte composition was prepared by weighing 300 mg of LCYGBC or LYZC and stirring/mixing with 150 mg of an organic solvent through the same procedure.

Removal of Organic Solvent through Vacuum Drying

Lithium ion conductivity was assessed for each solid electrolyte material powder formed by removing an organic solvent from a solid electrolyte composition through vacuum drying. Vacuum drying was performed under reduced pressure for 1 hour while maintaining the temperature of each solid electrolyte material at 150° C. in an atmosphere of the vapor pressure or lower at a temperature 20° C. lower than the boiling point of each organic solvent.

Measurement of Lithium Ion Conductivity

Lithium ion conductivity was measured using a pressing die 200 for each solid electrolyte material powder obtained through the above-described processing. The pressing die 200 comprises an electronically insulating polycarbonate die 201, and stainless steel upper punch 203 and lower punch 202.

Ionic conductivity was assessed by the following method using the pressing die illustrated in FIG. 1. A conductivity measurement cell was prepared, in a dry atmosphere of a dew point of −30° C. or lower, by filling the pressing die 200 with powder 100 of a solid electrolyte material, which had been obtained through vacuum drying of a solid electrolyte composition, and then by uniaxially pressing at 400 MPa.

Lithium ion conductivity at 25° C. was measured by an electrochemical impedance measurement method still in the pressed state by laying a conducting wire from each upper punch 203 and lower punch 202 and connecting the conducting wire to a potentiostat (VersaSTAT 4 from Princeton Applied Research) equipped with a frequency response analyzer.

Example 1

A solid electrolyte composition was prepared by the foregoing method using tetralin, which is an aromatic hydrocarbon, as an organic solvent and LYBC or LPS as a solid electrolyte material. Further, tetralin as an organic solvent was removed through the foregoing vacuum drying.

Lithium ion conductivity was measured by the foregoing method for LYBC and LPS from which tetralin had been removed to be $1.7 \times 10^{-3}$ S/cm for LYBC and $7.8 \times 10^{-4}$ S/cm for LPS.

Each solid electrolyte material of LYBC and LPS that had not been subjected to stirring/mixing with an organic solvent underwent the foregoing vacuum drying, and then the lithium ion conductivity was measured by the foregoing method to be $1.9 \times 10^{-3}$ S/cm for LYBC and $8.0 \times 10^{-4}$ S/cm for LPS. These are shown at the bottom of Table 1 as a reference example (C1).

In comparison with the lithium ion conductivity of LYBC in the reference example, the lithium ion conductivity of LYBC in Example 1 is almost comparable to that of the reference example without deterioration of LYBC due to tetralin.

Example 2

Through the same procedure as Example 1 except for using ethylbenzene, which is an aromatic hydrocarbon, as an organic solvent, lithium ion conductivity was measured for LYBC and LPS from which ethylbenzene had been removed to be $1.9 \times 10^{-3}$ S/cm for LYBC and $7.7 \times 10^{-4}$ S/cm for LPS. The lithium ion conductivities were almost comparable to those of the reference example without deterioration of LYBC due to ethylbenzene.

Example 3

Through the same procedure as Example 1 except for using mesitylene, which is an aromatic hydrocarbon, as an organic solvent, lithium ion conductivity was measured for LYBC and LPS from which mesitylene had been removed to be $1.9 \times 10^{-3}$ S/cm for LYBC and $7.9 \times 10^{-4}$ S/cm for LPS. The lithium ion conductivities were almost comparable to those of the reference example without deterioration of LYBC due to mesitylene.

Example 4

Through the same procedure as Example 1 except for using pseudocumene, which is an aromatic hydrocarbon, as an organic solvent, lithium ion conductivity was measured for LYBC and LPS from which pseudocumene had been removed to be $1.3 \times 10^{-3}$ S/cm for LYBC and $7.9 \times 10^{-4}$ S/cm for LPS. The lithium ion conductivities were almost comparable to those of the reference example without deterioration of LYBC due to pseudocumene.

Example 5

Through the same procedure as Example 1 except for using xylene, which is an aromatic hydrocarbon, as an organic solvent, lithium ion conductivity was measured for LYBC and LPS from which xylene had been removed to be $1.9 \times 10^{-3}$ S/cm for LYBC and $7.9 \times 10^{-4}$ S/cm for LPS. The lithium ion conductivities were almost comparable to those of the reference example without deterioration of LYBC due to xylene.

Example 6

Through the same procedure as Example 1 except for using cumene, which is an aromatic hydrocarbon, as an organic solvent, lithium ion conductivity was measured for LYBC and LPS from which cumene had been removed to be $1.2 \times 10^{-3}$ S/cm for LYBC and $7.4 \times 10^{-4}$ S/cm for LPS. The lithium ion conductivities were almost comparable to those of the reference example without deterioration of LYBC due to cumene.

As described in Examples 1 to 6, a solid electrolyte composition using LYBC and an aromatic hydrocarbon as an organic solvent can maintain a high lithium ion conductivity.

The case of using, as an organic solvent, hydrocarbons excluding those in the Examples is similarly feasible. However, from a viewpoint of applying a solid electrolyte composition and removing an organic solvent through vacuum drying, hydrocarbons that are liquid at room temperature and that have a boiling point of 250° C. or lower are desirable. Such hydrocarbons may be used alone or in mixture.

Moreover, although LYBC was used as a solid electrolyte material, other sulfur element-free ionic solid electrolyte materials may also be used.

Further, it is similarly feasible to use, among other ionic solid electrolyte materials, a sulfur element-free ionic solid electrolyte material that exhibits lithium ion conductivity, contains at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm, and contains at least one selected from the group consisting of Cl, Br, I, and F. These ionic solid electrolyte materials may be used alone or in mixture.

Example 7

Through the same procedure as Example 1 except for using, as an organic solvent, dibutyl ether having an ether group, lithium ion conductivity was measured for LYBC and LPS from which dibutyl ether had been removed to be $1.4 \times 10^{-3}$ S/cm for LYBC and $8.0 \times 10^{-4}$ S/cm for LPS. The lithium ion conductivities were almost comparable to those of the reference example without deterioration of LYBC due to dibutyl ether.

Example 8

Through the same procedure as Example 1 except for using anisole, which is an aromatic compound having an ether group, as an organic solvent, lithium ion conductivity was measured for LYBC and LPS from which anisole had been removed to be $1.9 \times 10^{-3}$ S/cm for LYBC and $8.0 \times 10^{-4}$ S/cm for LPS. The lithium ion conductivities were almost comparable to those of the reference example without deterioration of LYBC due to anisole.

Example 9

Through the same procedure as Example 1 except for using 1,2,4-trichlorobenzene, which is an aromatic compound having chloro groups, as an organic solvent, lithium ion conductivity was measured for LYBC from which 1,2,4-trichlorobenzene had been removed to be $1.7 \times 10^{-3}$ S/cm. The lithium ion conductivity was almost comparable to that of the reference example without deterioration of LYBC due to 1,2,4-trichlorobenzene.

Example 10

Through the same procedure as Example 1 except for using chlorobenzene, which is an aromatic compound having a chloro group, as an organic solvent, lithium ion conductivity was measured for LYBC and LPS from which chlorobenzene had been removed to be $1.8 \times 10^{-3}$ S/cm for LYBC and $7.9 \times 10^{-4}$ S/cm for LPS. The lithium ion conductivities were almost comparable to those of the reference example without deterioration of LYBC due to chlorobenzene.

Example 11

Through the same procedure as Example 1 except for using 2,4-dichlorotoluene, which is an aromatic compound having chloro groups, as an organic solvent, lithium ion conductivity was measured for LYBC from which 2,4-dichlorotoluene had been removed to be $1.7 \times 10^{-3}$ S/cm. The lithium ion conductivity was almost comparable to that of the reference example without deterioration of LYBC due to 2,4-dichlorotoluene.

Example 12

Through the same procedure as Example 1 except for using o-chlorotoluene, which is an aromatic compound having a chloro group, as an organic solvent, lithium ion conductivity was measured for LYBC and LPS from which o-chlorotoluene had been removed to be $1.6 \times 10^{-3}$ S/cm for LYBC and $7.9 \times 10^{-4}$ S/cm for LPS. The lithium ion conductivities were almost comparable to those of the reference example without deterioration of LYBC due to o-chlorotoluene.

Example 13

Through the same procedure as Example 1 except for using 1,3-dichlorobenzene, which is an aromatic compound having chloro groups, as an organic solvent, lithium ion conductivity was measured for LYBC from which 1,3-dichlorobenzene had been removed to be $1.7 \times 10^{-3}$ S/cm. The lithium ion conductivity was almost comparable to that of the reference example without deterioration of LYBC due to 1,3-dichlorobenzene.

Example 14

Through the same procedure as Example 1 except for using p-chlorotoluene, which is an aromatic compound having a chloro group, as an organic solvent, lithium ion conductivity was measured for LYBC and LPS from which p-chlorotoluene had been removed to be $1.6 \times 10^{-3}$ S/cm for LYBC and $7.7 \times 10^{-4}$ S/cm for LPS. The lithium ion conductivities were almost comparable to those of the reference example without deterioration of LYBC due to p-chlorotoluene.

Example 15

Through the same procedure as Example 1 except for using 1,2-dichlorobenzene, which is an aromatic compound having chloro groups, as an organic solvent, lithium ion conductivity was measured for LYBC from which 1,2-dichlorobenzene had been removed to be $1.6 \times 10^{-3}$ S/cm. The lithium ion conductivity was almost comparable to that of the reference example without deterioration of LYBC due to 1,2-dichlorobenzene.

Example 16

Through the same procedure as Example 1 except for using 1,4-dichlorobutane, which is a nonaromatic compound having chloro groups, as an organic solvent, lithium ion conductivity was measured for LYBC and LPS from which 1,4-dichlorobutane had been removed to be $1.6 \times 10^{-3}$ S/cm for LYBC and $7.6 \times 10^{-4}$ S/cm for LPS. The lithium ion conductivities were almost comparable to those of the reference example without deterioration of LYBC due to 1,4-dichlorobutane.

Example 17

Through the same procedure as Example 1 except for using 3,4-dichlorotoluene, which is an aromatic compound having chloro groups, as an organic solvent, lithium ion conductivity was measured for LYBC from which 3,4-dichlorotoluene had been removed to be $1.7 \times 10^{-3}$ S/cm. The lithium ion conductivity was almost comparable to that of the reference example without deterioration of LYBC due to 3,4-dichlorotoluene.

Although Examples 9 to 17 are examples using an organic solvent into which a chloro group as a halogen element has been introduced, organic solvents into which a functional group, such as a bromo group, an iodo group, or a fluoro group as another halogen element, has been introduced may also be used.

Moreover, an organic solvent into which various halogen groups selected from the group consisting of a chloro group, a bromo group, an iodo group, and a fluoro group have been introduced may also be used.

Example 18

Through the same procedure as Example 1 except for using, as an organic solvent, tetraethyl orthosilicate having Si—O—C groups, lithium ion conductivity was measured for LYBC and LPS from which tetraethyl orthosilicate had been removed to be $1.0 \times 10^{-3}$ S/cm for LYBC and $7.9 \times 10^{-4}$ S/cm for LPS. The deterioration of LYBC due to tetraethyl orthosilicate was acceptable.

As described in Examples 7 to 18, a solid electrolyte composition using LYBC as a solid electrolyte material and an organic solvent having an ether group, a halogen group, or a Si—O—C group can maintain a high lithium ion conductivity.

Example 19

A solid electrolyte composition was prepared by the foregoing method using tetralin, which is an aromatic hydrocarbon, as an organic solvent and LCYGBC as a solid electrolyte material. Subsequently, tetralin as an organic solvent was removed through the foregoing vacuum drying.

Lithium ion conductivity was measured by the foregoing method for LCYGBC from which tetralin had been removed to be $8.8 \times 10^{-4}$ S/cm.

A solid electrolyte material of LCYGBC that had not been subjected to stirring/mixing with an organic solvent underwent the foregoing vacuum drying, and the lithium ion conductivity was measured by the foregoing method to be $1.0 \times 10^{-3}$ S/cm. This is shown at the bottom of Table 2 as a reference example (C2).

In comparison with the lithium ion conductivity of LCYGBC in the reference example, the lithium ion conductivity of LCYGBC in Example 19 is almost comparable to that of the reference example without deterioration of LCYGBC due to tetralin.

Example 20

Through the same procedure as Example 19 except for using mesitylene, which is an aromatic hydrocarbon, as an organic solvent, lithium ion conductivity was measured for LCYGBC from which mesitylene had been removed to be $9.4 \times 10^{-4}$ S/cm. The lithium ion conductivity was almost comparable to that of the reference example without deterioration of LCYGBC due to mesitylene.

Example 21

Through the same procedure as Example 19 except for using cumene, which is an aromatic hydrocarbon, as an organic solvent, lithium ion conductivity was measured for LCYGBC from which cumene had been removed to be $1.0 \times 10^{-3}$ S/cm. The lithium ion conductivity was almost comparable to that of the reference example without deterioration of LCYGBC due to cumene.

As described in Examples 19 to 21, a solid electrolyte composition using LCYGBC and an aromatic hydrocarbon organic solvent can maintain a high lithium ion conductivity.

The case of using, as an organic solvent, hydrocarbons excluding those in the Examples is similarly feasible. However, from a viewpoint of applying a solid electrolyte composition and removing an organic solvent through vacuum drying, hydrocarbons that are liquid at room temperature and that have a boiling point of 250° C. or lower are desirable. Such hydrocarbons may be used alone or in mixture.

Example 22

Through the same procedure as Example 19 except for using, as an organic solvent, dibutyl ether having an ether group, lithium ion conductivity was measured for LCYGBC from which dibutyl ether had been removed to be $1.2 \times 10^{-3}$ S/cm. The lithium ion conductivity was almost comparable to that of the reference example without deterioration of LCYGBC due to dibutyl ether.

Example 23

Through the same procedure as Example 19 except for using anisole, which is an aromatic compound having an ether group, as an organic solvent, lithium ion conductivity was measured for LCYGBC from which anisole had been removed to be $9.2 \times 10^{-4}$ S/cm. The lithium ion conductivity was almost comparable to that of the reference example without deterioration of LCYGBC due to anisole.

Example 24

Through the same procedure as Example 19 except for using p-chlorotoluene, which is an aromatic compound having a chloro group, as an organic solvent, lithium ion conductivity was measured for LCYGBC from which p-chlorotoluene had been removed to be $1.1 \times 10^{-3}$ S/cm. The lithium ion conductivity was almost comparable to that of the reference example without deterioration of LCYGBC due to p-chlorotoluene.

Example 25

Through the same procedure as Example 19 except for using 3,4-dichlorotoluene, which is an aromatic compound having chloro groups, as an organic solvent, lithium ion conductivity was measured for LCYGBC from which 3,4-dichlorotoluene had been removed to be $1.0 \times 10^{-3}$ S/cm. The lithium ion conductivity was almost comparable to that of the reference example without deterioration of LCYGBC due to 3,4-dichlorotoluene.

Example 26

A solid electrolyte composition was prepared by the foregoing method using, as an organic solvent, p-chlorotoluene, which is an aromatic hydrocarbon, and LYZC as a solid electrolyte material. Subsequently, p-chlorotoluene as an organic solvent was removed through the foregoing vacuum drying.

Lithium ion conductivity was measured by the foregoing method for LYZC from which p-chlorotoluene had been removed to be $1.2 \times 10^{-3}$ S/cm.

A solid electrolyte material of LYZC that had not been subjected to stirring/mixing with an organic solvent underwent the foregoing vacuum drying, and the lithium ion conductivity was measured by the foregoing method to be $1.2 \times 10^{-3}$ S/cm. This is shown at the bottom of Table 3 as a reference example (C3).

In comparison with the lithium ion conductivity of LYZC in the reference example, the lithium ion conductivity of LYZC in Example 26 was almost comparable to that of the reference example without deterioration of LYZC due to p-chlorotoluene.

Although Examples 24 to 26 are examples using an organic solvent into which a chloro group as a halogen element has been introduced, organic solvents into which a functional group, such as a bromo group, an iodo group, or a fluoro group as another halogen element, has been introduced may also be used.

Moreover, an organic solvent into which various halogen groups selected from the group consisting of a chloro group, a bromo group, an iodo group, and a fluoro group have been introduced may also be used.

As described in Examples 19 to 26, a solid electrolyte composition using an organic solvent having an ether group or a halogen group and LCYGBC or LYZC as a solid electrolyte material can maintain a high lithium ion conductivity.

Organic solvents having an ether group, a halogen group, or a Si—O—C group excluding those in the Examples may also be used. However, from a viewpoint of applying a solid electrolyte composition and removing an organic solvent through vacuum drying, hydrocarbons that are liquid at room temperature, that have a boiling point of 250° C. or lower, and in which a hydrogen atom is replaced with any of the above-mentioned functional groups are desirable. These organic solvents may be used alone or in mixture.

Further, although LCYGBC and LYZC were used as solid electrolyte materials, other sulfur element-free ionic solid electrolyte materials may also be used.

Furthermore, it is similarly feasible to use, among other ionic solid electrolyte materials, any sulfur element-free ionic solid electrolyte material that exhibits lithium ion conductivity, contains at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm, and contains at least one selected from the group consisting of Cl, Br, I, and F. Such ionic solid electrolyte materials may be used alone or in mixture.

Comparative Example 1

Despite through the same procedure as Example 1 except for using butyl butyrate, which is a nonaromatic compound having an ester group, as an organic solvent, it was impossible to remove butyl butyrate in an attempt to measure lithium ion conductivity for LYBC from which butyl butyrate has been removed. From a viewpoint of applying a solid electrolyte composition and removing an organic solvent through vacuum drying, butyl butyrate was found unsuitable. Through the same procedure, lithium ion conductivity was measured also for LPS from which butyl butyrate had been removed to be $7.9 \times 10^{-4}$ S/cm. The lithium ion conductivity was almost comparable to that of the reference example without deterioration of LPS due to butyl butyrate.

Comparative Example 2

Despite through the same procedure as Example 1 except for using ethyl 3-ethoxypropionate, which is a nonaromatic compound having an ester group, as an organic solvent, an attempt to measure lithium ion conductivity for LYBC from which ethyl 3-ethoxypropionate has been removed failed due to high resistance. LYBC is thus considered to have significantly deteriorated due to ethyl 3-ethoxypropionate. Through the same procedure, lithium ion conductivity was measured also for LPS from which ethyl 3-ethoxypropionate had been removed to be $8.1 \times 10^{-4}$ S/cm. The lithium ion conductivity was almost comparable to that of the reference example without deterioration of LPS due to ethyl 3-ethoxypropionate.

Comparative Example 3

Through the same procedure as Example 1 except for using butyl acetate, which is a nonaromatic compound having an ester group, as an organic solvent, lithium ion conductivity was measured for LYBC and LPS from which butyl acetate had been removed to be $1.1 \times 10^{-9}$ S/cm for LYBC and $8.2 \times 10^{-4}$ S/cm for LPS. Since the lithium ion conductivity value is significantly lowered compared with that of the reference example, LYBC is considered to have deteriorated due to butyl acetate. The lithium ion conductivity of LPS was almost comparable to that of the reference example without deterioration due to butyl acetate.

Comparative Example 4

Despite through the same procedure as Example 1 except for using 2-ethylhexyl acrylate, which is a nonaromatic compound having an ester group, as an organic solvent, it was impossible to remove 2-ethylhexyl acrylate in an attempt to measure lithium ion conductivity for LYBC from which 2-ethylhexyl acrylate has been removed. From a viewpoint of applying a solid electrolyte composition and removing an organic solvent through vacuum drying, 2-ethylhexyl acrylate was found unsuitable. Through the same procedure, lithium ion conductivity was measured also for LPS from which 2-ethylhexyl acrylate had been removed to be $7.9 \times 10^{-4}$ S/cm. The lithium ion conductivity was almost comparable to that of the reference example without deterioration of LPS due to 2-ethylhexyl acrylate.

Comparative Example 5

Despite through the same procedure as Example 1 except for using 2-ethoxyethyl acetate, which is a nonaromatic compound having an ester group, as an organic solvent, it was impossible to remove 2-ethoxyethyl acetate in an attempt to measure lithium ion conductivity for LYBC from which 2-ethoxyethyl acetate has been removed. From a viewpoint of applying a solid electrolyte composition and removing an organic solvent through vacuum drying, 2-ethoxyethyl acetate was found unsuitable. Through the same procedure, lithium ion conductivity was measured also for LPS from which 2-ethoxyethyl acetate had been removed to be $8.2 \times 10^{-4}$ S/cm. The lithium ion conductivity was almost comparable to that of the reference example without deterioration of LPS due to 2-ethoxyethyl acetate.

Comparative Example 6

Despite through the same procedure as Example 1 except for using ethyl benzoate, which is an aromatic compound having an ester group, as an organic solvent, an attempt to measure lithium ion conductivity for LYBC from which ethyl benzoate has been removed failed due to high resistance. LYBC is thus considered to have significantly deteriorated due to ethyl benzoate. Through the same procedure, lithium ion conductivity was measured also for LPS from which ethyl benzoate had been removed to be $8.1 \times 10^{-4}$ S/cm. The lithium ion conductivity was almost comparable to that of the reference example without deterioration of LPS due to ethyl benzoate.

It was found that the organic solvents having an ester group described in Comparative Examples 1 to 6 cause deterioration of LYBC, which is an ionic solid electrolyte material, without causing deterioration of LPS, which is a covalently bonded solid electrolyte material. Accordingly, it may be considered unsuitable to use an organic solvent having an ester group for sulfur element-free ionic solid electrolyte materials.

Comparative Example 7

Despite through the same procedure as Example 1 except for using diisobutyl ketone, which is a nonaromatic compound having a ketone group, as an organic solvent, an attempt to measure lithium ion conductivity for LYBC from which diisobutyl ketone has been removed failed due to high resistance. LYBC is thus considered to have significantly deteriorated due to diisobutyl ketone. Through the same procedure, lithium ion conductivity was measured also for LPS from which diisobutyl ketone had been removed to be $7.2 \times 10^{-4}$ S/cm. The lithium ion conductivity was almost comparable to that of the reference example without deterioration of LPS due to diisobutyl ketone.

Comparative Example 8

Despite through the same procedure as Example 1 except for using isophorone, which is a cyclic nonaromatic compound having a ketone group, as an organic solvent, it was impossible to remove isophorone in an attempt to measure lithium ion conductivity for LYBC from which isophorone has been removed. From a viewpoint of applying a solid electrolyte composition and removing an organic solvent through vacuum drying, isophorone was found unsuitable. Through the same procedure, lithium ion conductivity was measured also for LPS from which isophorone had been removed to be $7.6 \times 10^{-4}$ S/cm. The lithium ion conductivity was almost comparable to that of the reference example without deterioration of LPS due to isophorone.

Comparative Example 9

Through the same procedure as Example 1 except for using N-methylpyrrolidone, which is a cyclic nonaromatic compound having a ketone group, as an organic solvent, lithium ion conductivity was measured for LYBC from which N-methylpyrrolidone had been removed to be $1.8 \times 10^{-7}$ S/cm. Since the value is significantly lowered compared with that of the reference example, LYBC is considered to have deteriorated due to N-methylpyrrolidone. Despite through the same procedure, an attempt to measure lithium ion conductivity also for LPS from which N-methylpyrrolidone has been removed failed due to high resistance. N-methylpyrrolidone that causes deterioration of both LYBC and LPS was found unusable.

Comparative Examples 7 to 9 revealed that an organic solvent having a ketone group causes deterioration of LYBC. Accordingly, it may be considered unsuitable to use an organic solvent having a ketone group for sulfur element-free ionic solid electrolyte materials.

Comparative Example 10

Despite through the same procedure as Example 1 except for using N,N-dimethyldodecylamine, which is a nonaromatic compound having an amino group, as an organic solvent, it was impossible to remove N,N-dimethyldodecylamine in an attempt to measure lithium ion conductivity for LYBC from which N,N-dimethyldodecylamine has been removed. From a viewpoint of applying a solid electrolyte composition and removing an organic solvent through vacuum drying, N,N-dimethyldodecylamine was found unsuitable. Through the same procedure, lithium ion conductivity was measured also for LPS from which N,N-dimethyldodecylamine had been removed to be $7.6 \times 10^{-4}$ S/cm. The lithium ion conductivity was almost comparable to that of the reference example without deterioration of LPS due to N,N-dimethyldodecylamine.

Comparative Example 11

Through the same procedure as Example 1 except for using N,N-dimethylaniline, which is an aromatic compound having an amino group, as an organic solvent, lithium ion conductivity was measured for LYBC from which N,N-dimethylaniline had been removed to be $7.5 \times 10^{-4}$ S/cm.

Since the value is significantly lowered compared with that of the reference example, LYBC is considered to have deteriorated due to N,N-dimethylaniline. Through the same procedure, lithium ion conductivity was measured also for LPS from which N,N-dimethylaniline had been removed to be $7.7 \times 10^{-4}$ S/cm. The lithium ion conductivity was almost comparable to that of the reference example without deterioration of LPS due to N,N-dimethylaniline.

Comparative Example 12

Through the same procedure as Example 1 except for using N-methylaniline, which is an aromatic compound having an amino group, as an organic solvent, lithium ion conductivity was measured for LYBC from which N-methylaniline had been removed to be $1.1 \times 10^{-7}$ S/cm. Since the value is significantly lowered compared with that of the reference example, LYBC is considered to have deteriorated due to N-methylaniline. Through the same procedure, lithium ion conductivity was measured also for LPS from which N-methylaniline had been removed to be $7.9 \times 10^{-4}$ S/cm. The lithium ion conductivity was almost comparable to that of the reference example without deterioration of LPS due to N-methylaniline.

Comparative Examples 10 to 12 revealed that an organic solvent having an amino group does not cause deterioration of LPS but causes deterioration of LYBC. Accordingly, it may be considered unsuitable to use an organic solvent having an amino group for sulfur element-free ionic solid electrolyte materials.

Comparative Example 13

Through the same procedure as Example 1 except for using 2-ethyl-1-hexanol, which is a nonaromatic compound having a hydroxy group, as an organic solvent, lithium ion conductivity was measured for LYBC from which 2-ethyl-1-hexanol had been removed to be $9.8 \times 10^{-6}$ S/cm. Since the value is significantly lowered compared with that of the reference example, LYBC is considered to have deteriorated due to 2-ethyl-1-hexanol. Through the same procedure, lithium ion conductivity was measured also for LPS from which 2-ethyl-1-hexanol had been removed to be $7.9 \times 10^{-4}$ S/cm. The lithium ion conductivity was almost comparable to that of the reference example without deterioration of LPS due to 2-ethyl-1-hexanol.

Comparative Example 13 revealed that an organic solvent having a hydroxy group does not cause deterioration of LPS but causes deterioration of LYBC. Accordingly, it may be considered unsuitable to use an organic solvent having a hydroxy group for sulfur element-free ionic solid electrolyte materials.

Comparative Example 14

Despite through the same procedure as Example 1 except for using benzaldehyde, which is an aromatic compound having an aldehyde group, as an organic solvent, it was impossible to remove benzaldehyde in an attempt to measure lithium ion conductivity for LYBC from which benzaldehyde has been removed. From a viewpoint of applying a solid electrolyte composition and removing an organic solvent through vacuum drying, benzaldehyde was found unsuitable. Through the same procedure, lithium ion conductivity was measured also for LPS from which benzaldehyde had been removed to be $7.5 \times 10^{-4}$ S/cm. The lithium ion conductivity was almost comparable to that of the reference example without deterioration of LPS due to benzaldehyde.

It was found that an organic solvent having an aldehyde group does not cause deterioration of LPS but causes deterioration of LYBC. Accordingly, it may be considered unsuitable to use an organic solvent having an aldehyde group for sulfur element-free ionic solid electrolyte materials.

Figure 2:
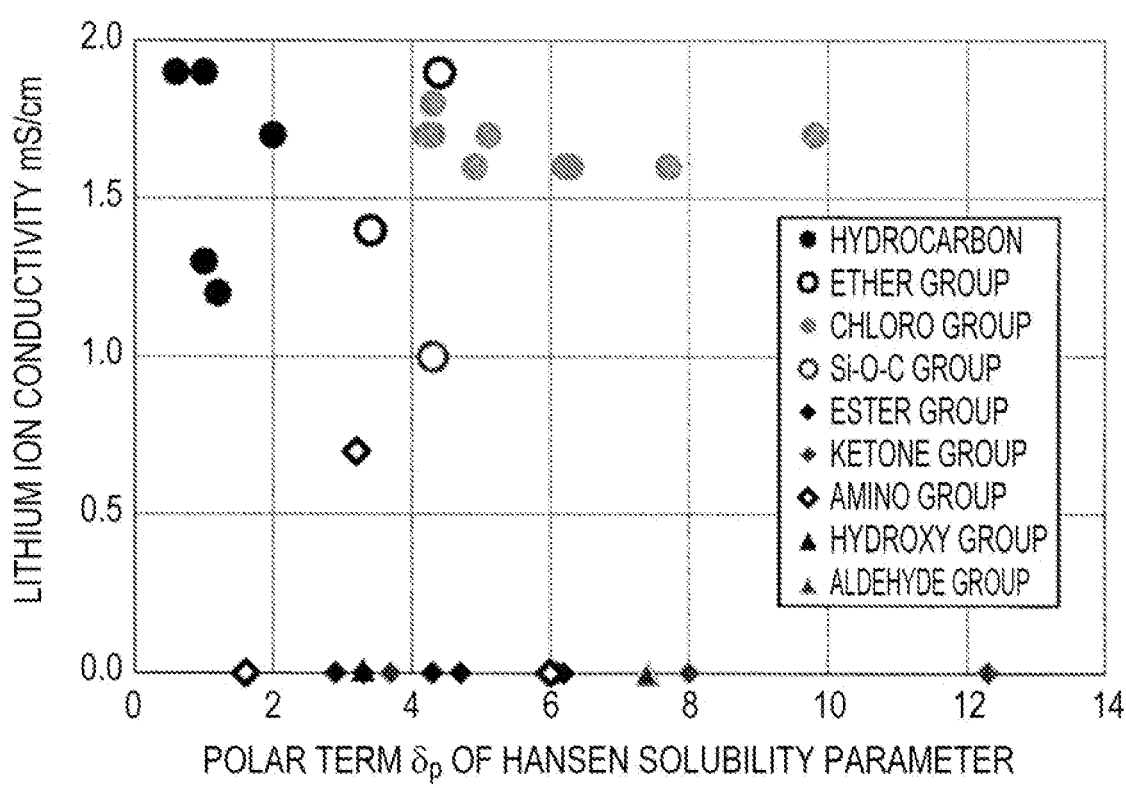
FIG. 2 is a graph showing the relationship between polar term of Hansen solubility parameter for each organic solvent and lithium ion conductivity of LYBC after vacuum drying.

FIG. 2 shows the values of Examples 1 to 18 and the values of Comparative Examples 1 to 14, where the horizontal axis represents the polar term value (arbitrary unit) of Hansen solubility parameter for organic solvents for LYBC shown in Table 1 and the vertical axis represents the lithium ion conductivity (mS/cm) of LYBC after vacuum drying. For organic solvents in the case of failed measurement of lithium ion conductivity due to high resistance or in the case of failed drying, the value of 0 mS/cm is plotted on the graph.

FIG. 2 reveals that the lithium ion conductivity of LYBC after vacuum drying is affected more by the substituted functional group of an organic solvent than by the polar term value of the organic solvent. The detailed mechanism of action is unknown. However, it is presumed that the introduction of a functional group that causes localization of electron density within an organic solvent molecule, such as an ester group, a ketone group, an amino group, or a hydroxy group, disrupts the structure of LYBC through solvation or other interactions between the localized site and the constituent elements of ionic LYBC, thereby lowering the lithium ion conductivity of LYBC after vacuum drying. This may be considered as the common trend among sulfur element-free ionic solid electrolyte materials.

Figure 3:
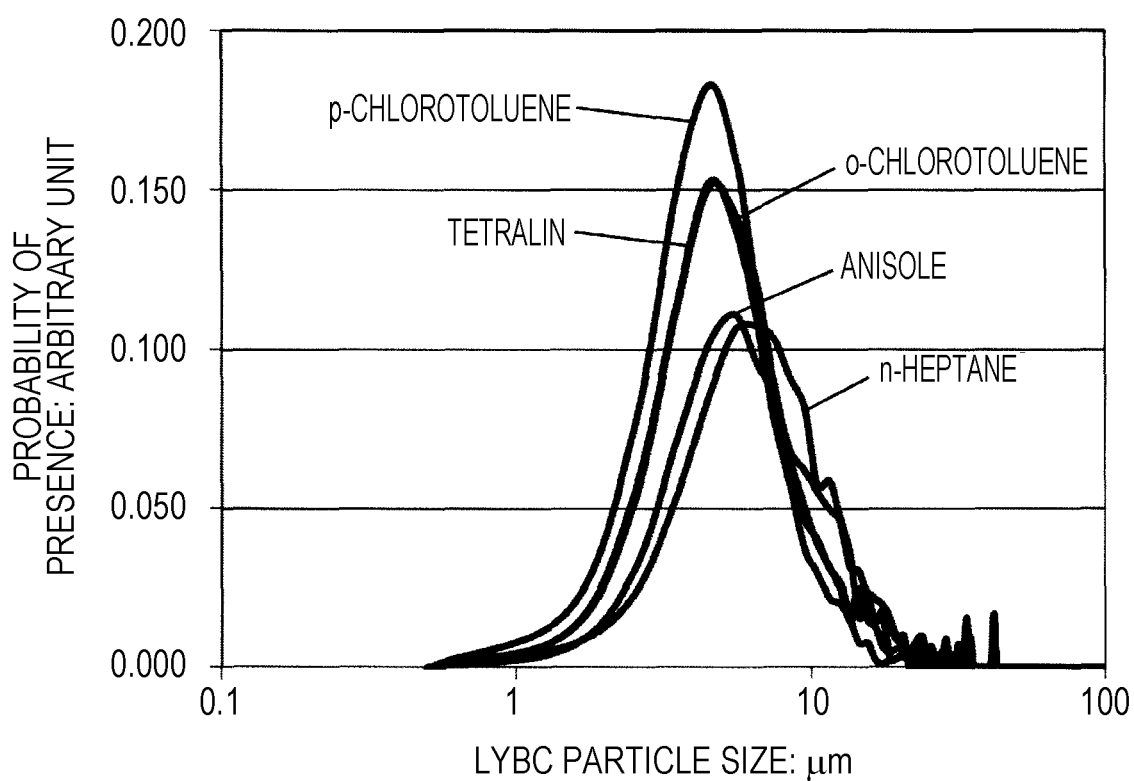
FIG. 3 is a graph showing the particle size distribution of LYBC in each organic solvent in Embodiment 1.

FIG. 3 shows the particle size distribution of LYBC in a solid electrolyte composition containing each organic solvent and LYBC. The particle size distribution was measured for five organic solvents of n-heptane, anisole, tetralin, o-chlorotoluene, and p-chlorotoluene. The horizontal axis represents the particle size (μm) measured by an image analysis-mode particle analysis system, and the vertical axis represents the probability of the presence (arbitrary unit).

Hereinafter, the details of the measurement method will be described.

Preparation of Solid Electrolyte Compositions

Inside a glove box under controlled argon atmosphere, 30 mL of an organic solvent and 0.006 g of LYBC were weighed, followed by stirring/mixing. The organic solvent was fully dried in advance with a molecular sieve. Moreover, to avoid penetration of moisture, oxygen, and so forth, a double container was used for stirring/mixing and the outer container was fed with a nonpolar solvent (specifically, heptane) and sealed. Under this condition, ultrasonic dispersion was performed for 30 minutes.

Particle Size Distribution Measurement

The measurement was performed using an image analysis-mode particle size distribution measurement system (model: XPT-C from PS Prozesstechnik GmbH) while stirring with a stirrer.

The peak values in particle size distribution of FIG. 3 are in the order of p-chlorotoluene>o-chlorotoluene≅tetralin>anisole>n-heptane. Here, the sign "≅" means substantially equal and the sign "≅" hereinafter has the same meaning. The peak values indicate dispersibility in each organic solvent, and solid electrolyte compositions have reduced aggregation of LYBC and satisfactory dispersibility in the order of p-chlorotoluene, o-chlorotoluene≅tetralin, anisole, and n-heptane. As in the foregoing, an organic solvent is desirably an aromatic compound. Particularly, when preparing a solid electrolyte composition containing an electrode active material, an aromatic compound is desirably used as an organic solvent.

INDUSTRIAL APPLICABILITY

A solid electrolyte composition according to the present invention is useful, for example, for manufacturing solid-state lithium secondary batteries.

What is claimed is:

1. A solid electrolyte composition comprising a sulfur element-free ionic solid electrolyte material and an organic solvent, wherein:
   the ionic solid electrolyte material is $Li_3YBr_2Cl_4$, $Li_{2.8}Ca_{0.1}Y_{0.5}Gd_{0.5}Br_2Cl_4$, or $Li_{2.5}Y_{0.5}Zr_{0.5}Cl_6$,
   the organic solvent includes at least one selected from the group consisting of tetralin, ethylbenzene, mesitylene, pseudocumene, cumene, 1,2,4-trichlorobenzene, chlorobenzene, 2,4-dichlorotoluene, o-chlorotoluene, p-chlorotoluene, 1,4-dichlorobutane, 3,4-dichlorotoluene, and tetraethyl orthosilicate.

2. A method of producing a solid electrolyte member, comprising removing the organic solvent from the solid electrolyte composition according to claim 1.

3. The method of producing a solid electrolyte member according to claim 2, wherein in the removing, the organic solvent is removed through drying under reduced pressure.

* * * * *